United States Patent [19]
Hughes et al.

[11] Patent Number: 5,737,196
[45] Date of Patent: Apr. 7, 1998

[54] ELECTRICAL POWER GENERATING SYSTEM PRODUCING ALTERNATING AND DIRECT CURRENT

[75] Inventors: Daniel L. Hughes, Rockford; Thomas S. Latos, Huntley, both of Ill.

[73] Assignee: Sundstrand Corporation, Rockford, Ill.

[21] Appl. No.: 695,445

[22] Filed: Aug. 12, 1996

[51] Int. Cl.$^6$ ................................................. H02M 5/45
[52] U.S. Cl. .................................................. 363/8; 363/37
[58] Field of Search ............................ 363/8–10, 15, 363/16, 95, 123, 131, 34, 36, 37

[56] References Cited

U.S. PATENT DOCUMENTS

| | | | |
|---|---|---|---|
| 4,103,325 | 7/1978 | Hyman et al. | 363/148 |
| 4,587,436 | 5/1986 | Cronin | 307/21 |
| 4,593,167 | 6/1986 | Nilssen | 363/23 |
| 4,601,051 | 7/1986 | Santurtun et al. | 378/118 |
| 4,931,919 | 6/1990 | Nguyen et al. | 363/8 |
| 5,181,169 | 1/1993 | Murugan | 363/17 |
| 5,208,738 | 5/1993 | Jain | 363/17 |
| 5,291,119 | 3/1994 | Cowett, Jr. | 323/207 |
| 5,404,093 | 4/1995 | Cowett, Jr. | 323/207 |
| 5,418,708 | 5/1995 | Nairus | 363/65 |

*Primary Examiner*—Matthew V. Nguyen
*Attorney, Agent, or Firm*—Antonelli, Terry, Stout & Kraus

[57] ABSTRACT

The present invention is an electrical power generating system and method of operation. An inverter (18) is responsive to a DC potential for producing a fundamental frequency alternating current output such as 400 Hz. three-phase AC including harmonics. A first harmonic suppression filter (22), coupled to the alternating current output, produces an output having reduced harmonics compared to the harmonics in the input of the inverter. An isolation transformer (61) has a primary coupled to an output (24) of the first harmonic filter, a first secondary for outputting the alternating current at the fundamental frequency, and a second secondary for also outputting the alternating current at the fundamental frequency. A first rectifier (65) is coupled to the output (63) of the first secondary and produces direct current including harmonics produced by the rectification. A second harmonic suppression filter (69), coupled to the output (67) of the rectifier, outputs direct current having reduced harmonics compared to the harmonics in the output of the fullwave rectifier.

20 Claims, 3 Drawing Sheets

ELECTRICAL POWER GENERATING SYSTEM PRODUCING ALTERNATING AND DIRECT CURRENT

TECHNICAL FIELD

The present invention relates to electrical power generating systems which produce alternating current and direct current utilizing an inverter and more particularly, to systems of the aforementioned type which minimize the number of harmonic suppression filters and transformers utilized therein.

BACKGROUND ART

FIG. 1 illustrates a block diagram of an electrical power generating system of the type used on airframes for producing 400 Hz. three-phase alternating current with an inverter for supplying electrical power to various alternating current loads and further 28 volt DC used for maintaining potential on batteries therein. In an airframe using electrical power generating systems of the aforementioned type, which are known as variable speed constant frequency (VSCF), each of the propulsion engines is provided with a so-called wild frequency generator which generates three-phase alternating current having a frequency proportional to the shaft speed of the propulsion engine. A three-phase variable frequency alternator 10, which is powered by a propulsion engine, produces variable frequency electrical current on an output 12. The variable frequency three-phase alternating current on output 12 is applied to a rectifier 14 which produces direct current on an output 16. The direct current on the output 16 applied to a DC to a three-phase 400 Hz. inverter and control 18 of conventional construction which includes a plurality of power semiconductor switches for producing the respective 400 Hz. phases. The three-phase 400 Hz. output 20 is applied to a harmonic suppression filter 22 of conventional design for the purpose of reducing odd voltage harmonics which are present in the output 20 from the three phase 400 Hz. inverter and control 18. The output 24 of the harmonic suppression filter, which contains reduced harmonics in comparison to the input 20 from the three-phase 400 Hz. inverter and control, is applied to an isolation transformer 26. The magnetic flux coupling between the primary and secondary of the isolation transformer 26 provides DC electrical isolation on the output 30 which is connected to the secondary thereof. A contactor 32 of conventional construction is controlled by the control portion of the three-phase 400 Hz. inverter and control 18 for the purpose of disconnecting the transformer 26 output 30 from the 400 Hz. three-phase bus 34 which is representative of the alternating current power conducting structure present on an airframe. The 400 Hz. three-phase bus 34 has several outputs, one of which is an output 36 which is connected to a circuit breaker 38 which functions to disconnect the 400 Hz. three-phase bus 34 from connection to a transformer rectifier unit (TRU) 40 as described below in conjunction with FIG. 2 which produces an output voltage of 28 volts DC which provide electrical power to various 28 volt DC loads.

FIG. 2 illustrates a block diagram of the TRU 40 of FIG. 1. An alternating voltage input 50 is applied to an input filter 52 which removes undesirable harmonics present in the alternating input current. The output 54 of the input filter 52 is applied to voltage step down and isolation transformer 56. The alternating current present on the output 58 of the isolation transformer is applied to a rectifier 60 which produces direct current on output 62 which contains undesirable voltage harmonics. A harmonic suppression filter 64 reduces the undesirable harmonics present in the output of the fullwave rectifier 62 and produces a DC output 66 which is at 28 volts.

The addition of a TRU of FIG. 2, which is a stand alone system, to an airframe electrical power generating system by connection to the 400 Hz. three-phase bus has disadvantages. In the first place, the TRU requires an input filter 52 and isolation transformer 56 which add substantially to TRU weight and additional cost to the electrical power generating system of an airframe which requires both 400 Hz. three-phase AC and 28 volts DC for providing the DC potential of the batteries in the airframe. Reduction of weight, complexity and cost are of crucial importance to improving electrical power generating systems on airframes.

See U.S. Pat. Nos. 4,103,325, 4,587,436, 5,181,169, 5,291,119, 5,404,093 and 5,418,708 for descriptions of direct current electrical power generation. U.S. Pat. No. 4,103,325 discloses an aircraft power and phase converter including 28 volt DC. U.S. Pat. No. 4,587,436 discloses 28 and 270 volt DC electrical power generation. U.S. Pat. No. 5,181,169 discloses conversion of 270 volt DC to 28 volt DC and conversion of 28 volt DC to 270 volt DC. U.S. Pat. Nos. 5,291,119 and 5,404,093 disclose auxiliary DC outputs. U.S. Pat. No. 5,418,708 discloses conversion of 270 volt DC to 28 volts DC.

DISCLOSURE OF THE INVENTION

The present invention is an improved electrical power generating system and method of electrical power generation which eliminates the input filter 52 of the TRU 40 of FIG. 2 and the isolation transformer 56 of the TRU of FIG. 2. As a result, when it is desired to generate 28 volts DC or another DC potential from 400 Hz. three-phase AC or another alternating current potential which is generated with an inverter, it is unnecessary to utilize a separate input filter and additional isolation transformer which have been used in TRU described above in conjunction with FIG. 2. Furthermore, the present invention may be used to generate other DC potentials, such as 270 volts DC used in airframes, from another output of the rectifier used for producing DC which is applied to the three-phase 400 Hz. inverter and control of the VSCF electrical power generating system in an airframe. As a result of eliminating the aforementioned filter 52 and a transformer 56 of the TRU 40 for generating 28 volt DC in an airframe, the number of components, cost and complexity of a hybrid electrical power generating system for generating both alternating current and direct current on an airframe is reduced from that using a TRU which is connected to the regulated three-phase 400 Hz. bus of VSCF electrical power generating system.

BEST MODE FOR CARRYING OUT THE INVENTION

Figure 3:
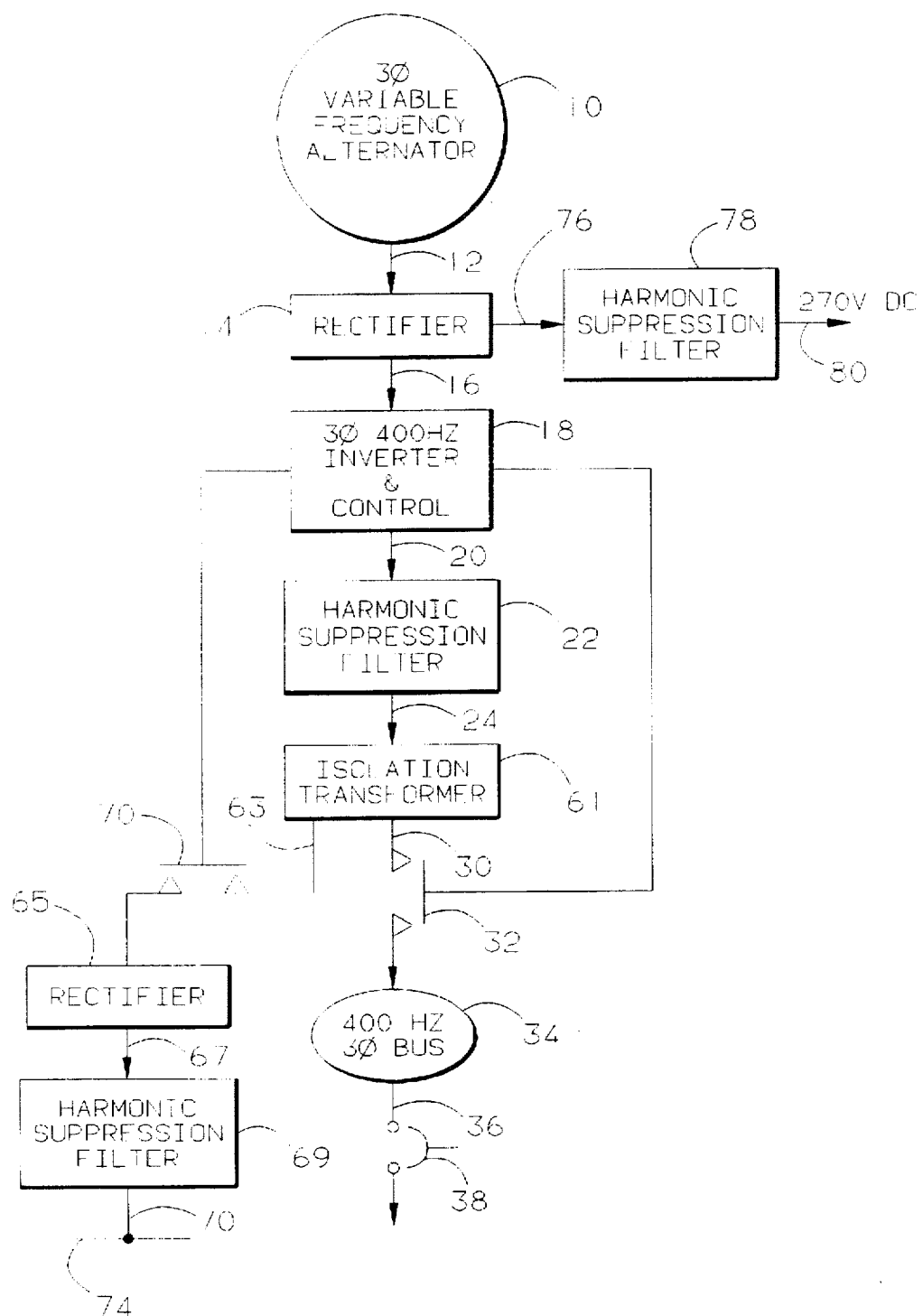
FIG. 3 illustrates a block diagram of an electrical power generating system in accordance with the present invention having a preferred application in an airframe Like reference numerals identify like parts throughout the drawings.

FIG. 3 illustrates a block diagram of an electrical power generating system in accordance with the present invention.

Figure 1:
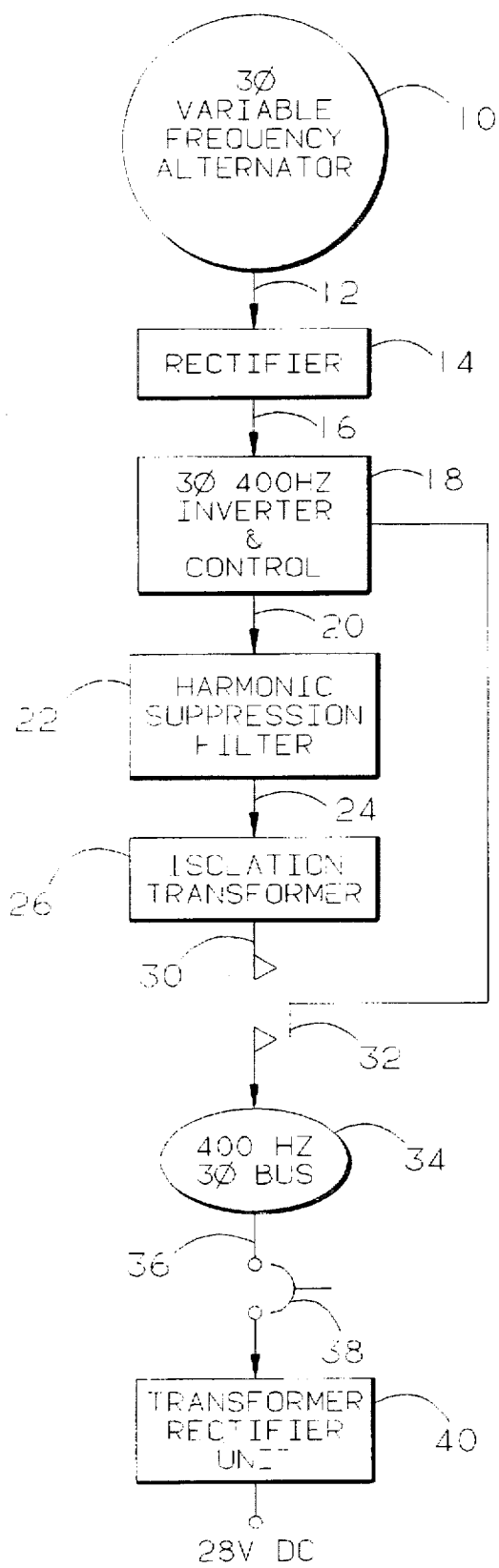
FIG. 1 illustrates a prior art VSCF electrical power generating system for use in an airframe.
Figure 2:
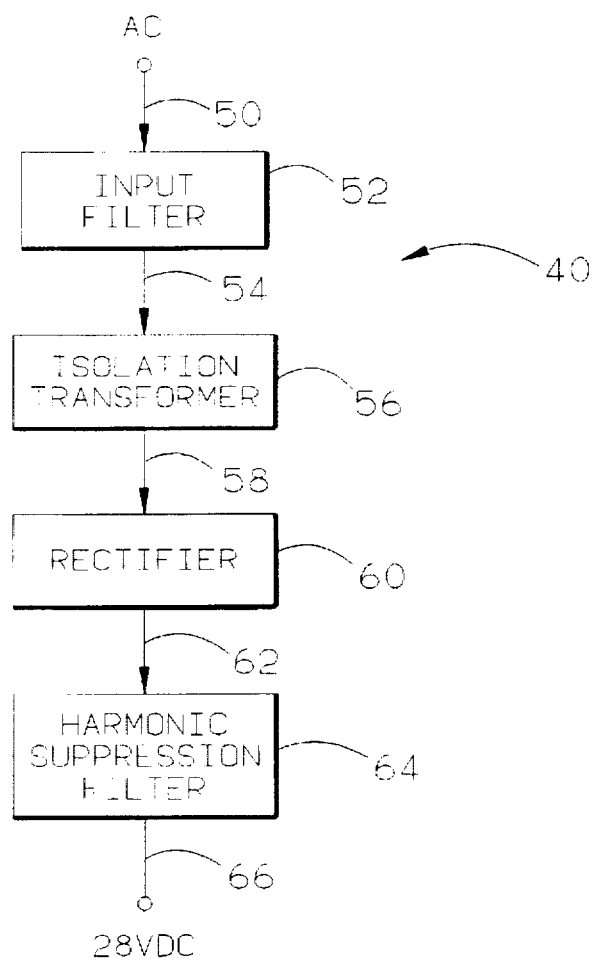
FIG. 2 illustrates a block diagram of a TRU in the electrical power generating system of FIG. 1.

Parts identical to the prior art system of FIG. 1 will not be discussed in detail. The embodiment of FIG. 3 differs from the embodiment of FIG. 1 in that the transformer rectifier unit 40 of FIG. 1 has been replaced with a simplified system which eliminates the input filter 52 of the TRU and further combines the isolation transformer 56 of the TRU with the isolation transformer 61 which performs the same function as in the prior art isolation transformer 26 of FIG. 1 to produce a first output 30 from a first secondary. In addition, the isolation transformer 61 contains a second secondary for outputting three-phase 400 Hz. alternating current on an output 63 through contactor 72 to a rectifier 65 for producing DC on an output 67 which includes harmonics produced by the rectification. The output 67 is applied to a harmonic suppression filter 69 of conventional construction which outputs on output 70 direct current having reduced harmonics compared to the harmonics in the output 67 of the rectifier 65. The contactor 72 is controlled by the control of the three-phase 400 Hz. inverter and control 18 to disconnect the output 63 from the 28 volt DC bus 74 when a fault occurs which could cause damage or failure of the solid state switches in the three-phase 400 Hz. inverter and control 18.

A comparison of the prior art for generating both 400 Hz. three-phase AC and 28 volt DC with the present invention reveals that the present invention eliminates the necessity for an input filter 52 which functions in the same manner as the harmonic suppression filter 22 and further, the isolation transformer 56 the function of which is now performed by adding a second secondary to the isolation transformer 61. As a result, the number of components required to generate three-phase 400 Hz. AC and 28 volt DC in comparison to the prior art has been reduced, the weight of the electrical power generating system has been reduced and further, the complexity and cost are reduced. The present invention has a preferred application in VSCF electrical power generating systems in an airframe but it should be understood that the present invention is not limited thereto and has applications where ever simplified hybrid generation of both alternating current and direct current is required utilizing an inverter as the source of the fundamental frequency of the alternating current and further the alternating current is rectified to produce the direct current.

As illustrated in FIG. 3, the second output 76 from the rectifier 14 may output 270 volt DC which is filtered by a harmonic suppression filter 78 to reduce the presence of harmonics present on the output 80 which is a 270 volt DC power bus for loads in airframes or other applications.

While the invention has been described in terms of its preferred embodiment, it should be understood that numerous modifications may be made thereto without departing from the spirit and scope of the invention. It is intended that all such modifications fall within the scope of the appended claims.

We claim:

1. An electrical power generating system comprising:
   an inverter, responsive to a DC potential, for producing a fundamental frequency alternating current output including harmonics;
   a first harmonic suppression filter, coupled to the alternating current output, for producing an output having reduced harmonics compared to the harmonics in the output of the inverter;
   a transformer having a primary coupled to the output of the first harmonic filter, a first secondary for outputting the alternating current at the fundamental frequency, and a second secondary for outputting the alternating current at the fundamental frequency;
   a first fullwave rectifier, coupled to an output of the second secondary, for producing direct current including harmonics produced by fullwave rectification; and
   a second harmonic suppression filter, coupled to the output of the fullwave rectifier, for outputting an output direct current having reduced harmonics compared to the harmonics in the output of the fullwave rectifier.

2. An electrical power generating system in accordance with claim 1 further comprising:
   an alternating current generator for producing alternating current on an output; and
   a second fullwave rectifier, coupled to the output of the alternating current generator, for producing direct current on a first output; and wherein
   the first output of the fullwave rectifier applies direct current to the inverter.

3. An electrical power generating system in accordance with claim 2 wherein:
   the alternating current generator produces alternating current at a fixed frequency.

4. An electrical power generating system in accordance with claim 2 wherein:
   the alternating current generator produces alternating current at a variable frequency.

5. An electrical power generating system in accordance with claim 4 wherein:
   the electrical power generating system comprises a variable speed constant frequency electrical power generating system.

6. An electrical power generating system in accordance with claim 2 wherein:
   the second fullwave rectifier has a second output which outputs direct current.

7. An electrical power generating system in accordance with claim 6 further comprising:
   a third harmonic suppression filter, having an input coupled to the second output of the second fullwave rectifier and an output from which direct current is outputted having reduced harmonics compared to harmonics present at the input thereof.

8. An electrical power generating system in accordance with claim 7 wherein:
   the output of the third harmonic suppression filter is 270 volt direct current;
   the output of the second harmonic suppression filter is 28 volt direct current; and
   the first secondary is 400 Hz 3ø electrical power.

9. An electrical power generating system in accordance with claim 3 wherein:
   the second fullwave rectifier has a second output which outputs direct current.

10. An electrical power generating system in accordance with claim 9 further comprising:
    a third harmonic suppression filter, having an input coupled to the second output of the second fullwave rectifier and an output from which direct current is outputted having reduced harmonics compared to harmonics present at the input thereof.

11. An electrical power generating system in accordance with claim 10 wherein:
    the output of the third harmonic suppression filter is 270 volt direct current;
    the output of the second harmonic suppression filter is 28 volt direct current; and the first secondary is 400 Hz 3∅ electrical power.

12. An electrical power generating system in accordance with claim 4 wherein:

the second fullwave rectifier has a second output which outputs direct current.

13. An electrical power generating system in accordance with claim 12 further comprising:

a third harmonic suppression filter, having an input coupled to the second output of the second fullwave rectifier and an output from which direct current is outputted having reduced harmonics compared to harmonics present at the input thereof.

14. An electrical power generating system in accordance with claim 13 wherein:

the output of the third harmonic suppression filter is 270 volt direct current;

the output of the second harmonic suppression filter is 28 volt direct current; and the first secondary is 400 Hz 3∅ electrical power.

15. An electrical power generating system in accordance with claim 5 wherein:

the second fullwave rectifier has a second output which outputs direct current.

16. An electrical power generating system in accordance with claim 15 further comprising:

a third harmonic suppression filter, having an input coupled to the second output of the second fullwave rectifier and an output from which direct current is outputted having reduced harmonics compared to harmonics present at the input thereof.

17. An electrical power generating system in accordance with claim 16 wherein:

the output of the third harmonic suppression filter is 270 volt direct current;

the output of the second harmonic suppression filter is 28 volt direct current; and the first secondary is 400 Hz 3∅ electrical power.

18. A method of electrical power generation comprising:

producing a fundamental frequency alternating current output including harmonics with an inverter responsive to a DC potential;

filtering the fundamental frequency alternating current output to produce an alternating current output with reduced harmonics compared to the alternating current output from the inverter;

applying the filtered alternating current to a primary of a transformer to produce alternating current on a first secondary of the transformer at the fundamental frequency and to produce alternating current on a second secondary at the fundamental frequency;

rectifying the alternating current produced by the first secondary to produce direct current including harmonics produced by the fullwave rectification; and filtering the rectified direct current including harmonics to produce a direct current output having reduced harmonics compared to the harmonics present in the rectified current produced on the second secondary.

19. A method of electrical power generation in accordance with claim 18 further comprising:

producing an output of alternating current from an alternating current generator; and rectifying the output of the alternating current from the alternating current generator to produce direct current which is applied to the inverter.

20. A method of electrical power generation in accordance with claim 19 wherein:

the alternating current generator produces variable frequency alternating current.

* * * * *